US012694794B2

(12) United States Patent
Neubauer et al.

(10) Patent No.: US 12,694,794 B2
(45) Date of Patent: Jul. 28, 2026

(54) APPARATUS AND METHOD FOR DETERMINING NETWORK COVERAGE DATA FOR CONNECTING A MOBILE TERMINAL

(71) Applicant: Dimetor GmbH, Altenberg bei Linz (AT)

(72) Inventors: Thomas Neubauer, Altenberg bei Linz (AT); Thomas Wana, Vienna (AT)

(73) Assignee: Dimetor GmbH, Altenberg bei Linz (AT)

( * ) Notice: Subject to any disclaimer, the term of this patent is extended or adjusted under 35 U.S.C. 154(b) by 1123 days.

(21) Appl. No.: 16/899,887

(22) Filed: Jun. 12, 2020

(65) Prior Publication Data

US 2020/0394929 A1 Dec. 17, 2020

(30) Foreign Application Priority Data

Jun. 14, 2019 (EP) .................................... 19180368

(51) Int. Cl.
*G08G 5/00* (2006.01)
*B64C 39/02* (2006.01)
(Continued)

(52) U.S. Cl.
CPC ................ *G08G 5/55* (2025.01); *G08G 5/26* (2025.01); *G08G 5/57* (2025.01); *G08G 5/59* (2025.01);
(Continued)

(58) Field of Classification Search
CPC .................................................. G08G 5/0069
See application file for complete search history.

(56) References Cited

U.S. PATENT DOCUMENTS 7,953,372 B2 * 5/2011 Ofek .................... H04B 7/0491
455/67.14
8,184,594 B2 * 5/2012 Li ..................... H04W 36/0061
455/438
(Continued)

FOREIGN PATENT DOCUMENTS

AU 2016368552 B2 * 9/2019 ......... G01C 21/3453
WO WO-2011134286 A1 * 11/2011 ............ H04W 36/14
(Continued)

OTHER PUBLICATIONS

Hazim Shakhatreh, et al. "Unmanned Aerial Vehicles (UAVs): A Survey on Civil Applications and Key Research Challenges", IEEE Access, vol. 7, Apr. 9, 2019, pp. 48572-48634, XP011720255,DOI: 10.1109/ACCESS.2019.2909530.
(Continued)

*Primary Examiner* — Jean Paul Cass
(74) *Attorney, Agent, or Firm* — The Webb Law Firm

(57) ABSTRACT
Provided are an apparatus and a method for computing plural-network coverage data for connecting a mobile communication device. The apparatus comprises an input interface configured for acquiring current network-specific coverage data respectively from the plurality of communication networks and circuitry configured for combining the acquired current network-specific coverage data from the plurality of communication networks and for determining, based on the combination, plural-network coverage data indicating current network connectivity at a location in the area. Further provided is a guiding node and a guiding method. The disclosed techniques may facilitate providing redundancy in connectivity for use cases having high demands on connectivity, including guidance and operation of unmanned aerial vehicles (UAVs).

12 Claims, 4 Drawing Sheets

(51) Int. Cl.

| | |
|---|---|
| *B64U 101/20* | (2023.01) |
| *G08G 5/26* | (2025.01) |
| *G08G 5/55* | (2025.01) |
| *G08G 5/57* | (2025.01) |
| *G08G 5/59* | (2025.01) |

(52) U.S. Cl.
CPC ...... *B64U 2101/20* (2023.01); *B64U 2201/20* (2023.01)

(56) References Cited

U.S. PATENT DOCUMENTS

| | | | |
|---|---|---|---|
| 9,363,690 | B1 | 6/2016 | Singh et al. |
| 9,818,303 | B2 | 11/2017 | Kotecha |
| 10,438,494 | B1 | 10/2019 | Hahn |
| 2014/0226584 | A1 | 8/2014 | Cullen et al. |
| 2015/0336667 | A1* | 11/2015 | Srivastava ........... G05D 1/1064 701/2 |
| 2016/0174110 | A1* | 6/2016 | Sharma ................. H04W 48/18 370/329 |
| 2016/0300493 | A1 | 10/2016 | Ubhi et al. |
| 2016/0328980 | A1 | 11/2016 | Sharma et al. |
| 2016/0371985 | A1 | 12/2016 | Kotecha |
| 2017/0069214 | A1* | 3/2017 | Dupray .................... G08G 5/56 |
| 2017/0164257 | A1* | 6/2017 | Ross ...................... H04W 24/08 |
| 2017/0208512 | A1* | 7/2017 | Aydin .................. G05D 1/0022 |
| 2017/0278409 | A1 | 9/2017 | Johnson et al. |
| 2018/0038695 | A1 | 2/2018 | Bitra et al. |
| 2018/0293897 | A1* | 2/2018 | Murphy ................ H04W 24/08 |
| 2018/0375568 | A1 | 12/2018 | De Rosa et al. |
| 2019/0044609 | A1 | 2/2019 | Winkle et al. |
| 2019/0045406 | A1* | 2/2019 | Kalathil ............ H04W 36/0094 |
| 2019/0230606 | A1 | 7/2019 | Ryu et al. |
| 2020/0195521 | A1 | 6/2020 | Bogineni et al. |
| 2020/0266903 | A1 | 8/2020 | De Rosa et al. |
| 2021/0325906 | A1* | 10/2021 | White ............... G01C 21/3807 |
| 2021/0325907 | A1* | 10/2021 | White ...................... G08G 5/76 |
| 2022/0069876 | A1 | 3/2022 | Xue et al. |

FOREIGN PATENT DOCUMENTS

| | | |
|---|---|---|
| WO | 2015114572 A1 | 8/2015 |
| WO | 2018013234 A1 | 1/2018 |
| WO | 2018086140 A1 | 5/2018 |

OTHER PUBLICATIONS

Lin et al., "The Sky Is Not the Limit: LTE for Unmanned Aerial Vehicles", IEEE Communications Magazine, 2018, pp. 204-210, vol. 56, No. 4.

Lin et al., "Prototype Hierarchical UAS Traffic Management System in Taiwan", IEEE Integrated Communications, Navigation, and Surveillance Conference, 2019, pp. 1-13.

"Atoll Overview", Forsk, retrieved from https://www.forsk.com/atoll-overview.

"Telecommunication", AW3D, retrieved from https://www.aw3d.jp/en/applications/?id=663.

"UAS ATM CARS Common Altitude Reference System Discussion Document", European Organisation for the Safety of the Air Navigation (EUROCONTROL), 2018, 27 pages, Edition 1.0, retrieved from https://www.eurocontrol.int/sites/default/files/2019-05/uas-atm-cars-v1.0-release-20181127_0.pdf.

"Fact Sheet—Small Unmanned Aircraft Regulations (Part 107)", Federal Aviation Administration, 2016, 3 pages, retrieved from https://www.faa.gov/news/fact_sheets/news_story.cfm?newsId=20516.

"Product Overview", Infovista, 2020, retrieved from https://www.infovista.com/planet/rf-planning-optimization.

"Geodata for RF Planning and Optimization", LuxCarta, 2018, retrieved from https://luxcarta.com/product/geodata-for-rf-planning-and-optimization/.

"Geospatial Products for RF Planning and Optimization", LuxCarta, 2018, retrieved from https://luxcarta.com/resources/LuxCarta_RFPlanning&Optimization_2018_web.pdf.

"iBuildNet Professional User Manual", Ranplan Wireless, retrieved from https://ranplanwireless.com/files/National%20Advisory/Advanced%20Material/iBuildNet%204.0%20User%20manual.pdf.

"Radio Planning", TEOCO, 2020, accessed Jun. 11, 2020, retrieved from https://www.teoco.com/products/planning-optimization/asset-radio-planning/.

"Digital Maps, Radio Frequency (RF) Map, RF Planning", Visicom, 2020, retrieved from https://visicomdata.com/.

\* cited by examiner

120

Current plural-network data interface

130

Plural network data processing circuitry

100

Acquiring current network-specific data

S210

Combining acquired network-specific data

S220

Determining plural-network coverage data

S230

APPARATUS AND METHOD FOR DETERMINING NETWORK COVERAGE DATA FOR CONNECTING A MOBILE TERMINAL

CROSS-REFERENCE TO RELATED APPLICATIONS

This application claims priority to European Patent Application No. 19180368.3 filed Jun. 14, 2019, the disclosure of which is hereby incorporated by reference in its entirety.

BACKGROUND

1. Technical Field

The present disclosure relates to the field of wireless communication. In particular, an apparatus and a method are disclosed herein for determining network coverage data for connecting a mobile terminal.

2. Related Art

In wireless communication, conventional handover procedures include intra-RAT (radio access technology) handover, inter-RAT handover, and roaming. In intra-RAT handover, an active communication of a mobile terminal is switched between different network nodes of the same RAT or communication system, e.g. between two eNodeBs of an LTE (Long Term Evolution) network. In inter-RAT handover, the switch is performed between respectively different communication systems. Inter RAT handover includes a handover between different hierarchically related mobile communication systems, such as a handover from LTE to UMTS (Universal Mobile Telecommunications Systems), or a handover between a network node of a mobile communication system such as LTE and a Wi-Fi router. Roaming is performed when a mobile terminal moves between areas respectively served by different communication networks, such as network operators in different countries or regions. Wireless networks may be operated by different network providers. In such scenarios, handover and roaming are performed within the network of the same provider or partners of the respective provider, e.g. in another country. This may lead to terrestrial areas with multiple coverage including networks of several operators, technologies (RATs), and/or sizes (e.g. macro-cells, micro-cells, femto-cells).

SUMMARY

The techniques of the present disclosure facilitate enabling a mobile terminal to be stably connected to mobile communication systems, especially when the mobile terminal is moving.

Provided is an apparatus for computing plural-network coverage data for connecting a mobile communication device to a communication network from among a plurality of communication networks serving an area, wherein the plurality of communication networks include communication networks of the same standard operated by a plurality of network operators, comprising at least one input interface configured for acquiring current network-specific coverage data respectively from the plurality of communication networks and circuitry configured for combining the acquired current network-specific coverage data from the plurality of communication networks and for determining, based on the combination, plural-network coverage data indicating current network connectivity at a location in the area.

Accordingly, guidance of network controlled, network guided or network monitored mobile devices can be facilitated using by a redundancy in connectivity provided by multiple communication networks.

In some embodiments, circuitry is configured for comparing, based on the received current network data, respective connectivity of the plurality of communication networks at the location and to select, based on the comparison, a communication network for connecting the mobile communication device at the location from among the plurality of communication networks.

For instance, the plural-network coverage data indicates network connectivity along two or three dimensions in the area.

For example, the area is a three-dimensional, 3D, flight area and the mobile communication device is an unmanned aerial vehicle, UAV, guided in the 3D flight area.

Accordingly, safe guidance and control of UAVs is facilitated.

In some embodiments, the at least one interface is configured for acquiring a result of a connectivity measurement performed by the UAV.

This facilitates enabling validation and precise assessment of a current connectivity status at a location of the UAV.

In some embodiments, the apparatus comprises an output interface configured for automatically reporting the plural-network coverage data to an aviation control node.

This facilitates guidance, control and safe operation of network-controlled UAVs.

For instance, the plurality of communication networks include a plurality of terrestrial radio networks operated by a plurality of operators.

For example, the plurality of communication networks include at least one of a terrestrial radio network and a satellite network.

In some embodiments, the plural-network coverage data include at least one of signal power, interference, an indication of a number of communication terminals per area unit, and an indication of a handover probability of handover by the mobile communication device from one network node to another network node.

For example, the handover probability includes at least one of an intra-network handover probability of handover within one communication network from among the plurality of communication networks and an inter-network handover probability of handover between respectively different communication networks from among the plurality of communication networks.

This facilitates alleviating a risk in loss of connection to a communication network due to handover.

In some embodiments, the acquired current network-specific coverage data is single-network coverage data determined respectively by the operators of the plurality of communication networks.

Further provided is a method for computing plural-network coverage data for connecting a mobile communication device to a communication network from among a plurality of communication networks serving an area, wherein the plurality of communication networks include communication networks of the same standard operated by a plurality of network operators, comprising acquiring current network-specific coverage data respectively from the plurality of communication networks, combining the acquired current network-specific coverage data from the plurality of communication networks, and determining, based on the combination, plural-network coverage data indicating current network connectivity at a location in the area.

Accordingly, guidance of network controlled, network guided or network monitored mobile devices can be facilitated using by a redundancy in connectivity provided by multiple communication networks.

In some embodiments, the method comprises comparing, based on the received current network data, respective connectivity of the plurality of communication networks at the location and to select, based on the comparison, a communication network for connecting the mobile communication device at the location from among the plurality of communication networks.

For instance, the plural-network coverage data indicates network connectivity along two or three dimensions in the area.

For example, the area is a three-dimensional, 3D, flight area and the mobile communication device is an unmanned aerial vehicle, UAV, guided in the 3D flight area.

Accordingly, safe guidance and control of UAVs is facilitated.

In some embodiments, the method comprises acquiring a result of a connectivity measurement performed by the UAV.

This facilitates enabling validation and precise assessment of a current connectivity status at a location of the UAV.

In some embodiments, the method comprises automatically reporting the plural-network coverage data to an aviation control node.

This facilitates guidance, control and safe operation of network-controlled UAVs.

For instance, the plurality of communication networks include a plurality of terrestrial radio networks operated by a plurality of operators.

For example, the plurality of communication networks include at least one of a terrestrial radio network and a satellite network.

In some embodiments, the plural-network coverage data include at least one of signal power, interference, an indication of a number of communication terminals per area unit, and an indication of a handover probability of handover by the mobile communication device from one network node to another network node.

For example, the handover probability includes at least one of an intra-network handover probability of handover within one communication network from among the plurality of communication networks and an inter-network handover probability of handover between respectively different communication networks from among the plurality of communication networks.

This facilitates alleviating a risk in loss of connection to a communication network due to handover.

In some embodiments, the acquired current network-specific coverage data is single-network coverage data determined respectively by the operators of the plurality of communication networks.

Further provided is a guiding node comprising an input interface configured for acquiring plural-network coverage data for connecting a mobile communication device to a communication network from among a plurality of communication networks serving an area, wherein the plurality of communication networks include communication networks of the same standard operated by a plurality of network operators, the plural-network coverage data indicating current network connectivity at a location in the area and being determined based on an aggregation of current network-specific coverage data from the plurality of communication networks, and circuitry configured for performing guiding of the mobile communication device based on the acquired plural-network coverage data.

In some embodiments, the guiding node is a control node for guiding an unmanned aerial vehicle, UAV, in a three-dimensional flight area within air space.

Further provided is a guiding method comprising acquiring plural-network coverage data for connecting a mobile communication device to a communication network from among a plurality of communication networks serving an area, wherein the plurality of communication networks include communication networks of the same standard operated by a plurality of network operators, the plural-network coverage data indicating current network connectivity at a location in the area and being determined based on an aggregation of current network-specific coverage data from the plurality of communication networks and performing guiding of the mobile communication device based on the acquired plural-network coverage data.

Also provided is a computer program comprising instructions which, when the program is executed by a computer, cause the computer to carry out the steps of acquiring current network-specific coverage data respectively from the plurality of communication networks, combining the acquired current network-specific coverage data from the plurality of communication networks, and determining, based on the combination, plural-network coverage data indicating current network connectivity at a location in the area, wherein the plurality of communication networks include communication networks of the same standard operated by a plurality of network operators.

Further provided is a computer program comprising instructions which, when the program is executed by a computer, cause the computer to carry out the steps of acquiring plural-network coverage data for connecting a mobile communication device to a communication network from among a plurality of communication networks serving an area, wherein the plurality of communication networks include communication networks of the same standard operated by a plurality of network operators, the plural-network coverage data indicating current network connectivity at a location in the area and being determined based on an aggregation of current network-specific coverage data from the plurality of communication networks and performing guiding of the mobile communication device based on the acquired plural-network coverage data.

Also provided is a non-transitory computer readable storage medium having stored thereon instructions to cause processing circuitry of an apparatus for computing plural-network coverage data for connecting a mobile communication device to a communication network from among a plurality of communication networks serving an area to carry out the steps of acquiring current network-specific coverage data respectively from the plurality of communication networks, combining the acquired current network-specific coverage data from the plurality of communication networks, and determining, based on the combination, plural-network coverage data indicating current network connectivity at a location in the area, wherein the plurality of communication networks include communication networks of the same standard operated by a plurality of network operators.

Also provided is a non-transitory computer readable storage medium having stored thereon instructions to cause processing circuitry of a guiding node to execute the steps of acquiring plural-network coverage data for connecting a mobile communication device to a communication network from among a plurality of communication networks serving an area, wherein the plurality of communication networks include communication networks of the same standard operated by a plurality of network operators, the plural-network coverage data indicating current network connectivity at a location in the area and being determined based on an aggregation of current network-specific coverage data from the plurality of communication networks and performing guiding of the mobile communication device based on the acquired plural-network coverage data.

BRIEF DESCRIPTION OF DRAWINGS

In the following detailed description, exemplary embodiments are described in more detail with reference to the accompanying figures and drawings, wherein.

DETAILED DESCRIPTION

Figure 1:
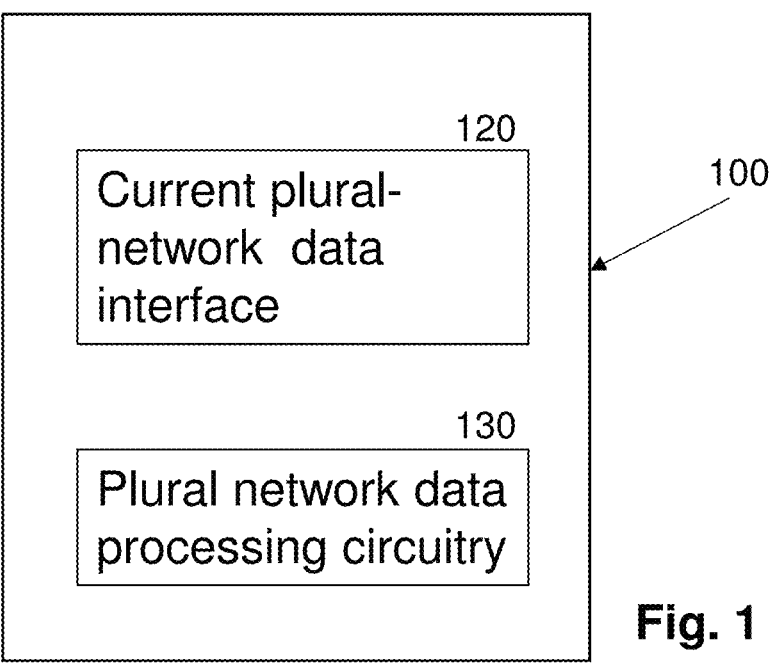
FIG. 1 is a block diagram of an apparatus for computing plural-network coverage data.

Conventionally, network coverage is determined respectively per mobile communication network and per operator. Coverage areas can be viewed with respect to individual networks of different network providers.

In view of this, the present disclosure is directed at linking coverage and connectivity data of a plurality of wireless communication networks operated by respectively different network operators. The techniques disclosed herein facilitate increasing the coverage area where a mobile communication signal is available.

As an exemplary but not limiting use case of the disclosed techniques, unmanned aviation, in particular BVLOS (beyond visual line of sight), has strict requirements on the availability of a radio signal in three-dimensional air space. To control unmanned aerial vehicles (UAVs) in BVLOS operation, a radio signal needs to be permanently available at the current location of the UAV along its flight path in air space, to provide a sufficient degree of safety.

More particularly, the present disclosure proposes establishing a common area of coverage of respectively different networks with overlapping individual coverage areas, and the planning and determination of areas or zones of transition between the networks.

Typically, mobile devices transition between networks, which may be operated by competing wireless operators and may use different frequencies or carriers, when a) the device is moved from one country into a different country (known as international roaming) or b) when moving from network operator A to network operator B (e.g. from carrier A to carrier B) inside the same country or region while still being a subscriber with operator A. This transition generally requires that the international or foreign operator, or operators A and B, respectively, have agreements in place that allow and facilitate such transition/roaming. Another possibility of transition between networks may be provided by MVNOs, Mobile Virtual Networks Operators, which are operators who do not have their own networks or wireless equipment. But, such MVNOs are buying network services from one or more regular operators and then resell these services. With this, the subscriber may be unaware of the transition or roaming between different networks that is actually happening. Operators may be distinguished by carriers (frequencies or frequency ranges) or other resources.

The selection of the respective network is happening in a similar way as the cell-selection within a single network. E.g., when the signal strength and/or quality of the signal of network B is sufficiently better than in network A, at a given location for a continuous period of time, the device is seamlessly handing over to the respective other network—provided the operators have agreements allowing that.

Different to the requirements for operating a single wireless network service, in aviation as well as mission critical self-driving scenarios, one of the key principles for safety is redundancy. For example, for safe BVLOS flight operation of UAVs it may be a requirement to have sufficiently good connectivity to more than a single wireless network. In order to compute the 3D areas that provide such redundancy of connectivity to more than one wireless network, it becomes a necessity to plan and control UAV operation using different networks considering and using different networks jointly.

The techniques provided to this end may facilitate planning and provision of roaming redundancy for roaming between these networks.

Provided is an apparatus 100, which is shown in FIG. 1, for computing plural network data for connecting a mobile communication device to a communication network from among a plurality of communication networks serving an area.

The apparatus 100 may be a processing node such as a server, an array of servers, or a data base, e.g. a server of a cloud computing service.

The plurality of communication networks may respectively be wireless communication networks or radio communication networks like cellular networks such as UMTS, LTE or New Radio, 4G, 5G, WiMAX or any other network. Network nodes of one or more of the networks may include, for example, base stations of the wireless communication systems or networks, such as an eNodeB or similar base station of LTE, which have one or more transmission and reception antennas. However, the disclosure is not limited to the above-mentioned systems, and the plurality of communication systems may comprise other systems. E.g., other terrestrial systems or different systems such as satellite radio systems may be included as well. Accordingly, in addition or as an alternative to base stations, the network nodes may include satellites.

The area may partially or completely include the areas of service of the plurality of communication networks. Therein, among the plurality of areas of service of the respective networks there may be areas which partially or completely overlap or be adjacent to each other. For instance, the area may include a state border, and state areas on the respective sides of the border may respectively be served by one or more communication networks.

The mobile communication device may be a user equipment (UE) or user terminal connectable to network nodes of the plurality of communication networks over a wireless channel. For instance, the mobile communication device may further include a vehicle, such as a car or a UAV (unmanned aerial vehicle) equipped with a one or more SIM(s) (subscriber identity module(s)).

In particular, the UAV may be a radio controlled UAV which receives control commands from a remote aviation control node, such as a UTM system or a UAV service provider, via wireless radio network. These control commands may include steering commands such as a change in direction or height or other commands for controlling the flight operation, e.g. power usage or requests for information, such as connectivity measurements.

However, a UAV may also have a lower degree of control corresponding to a higher degree of autonomous operation. In such a case, the UAV may use the radio connection for information for assisting autonomous control, such as navigation information, warnings, requested destinations, or information on traffic such as other UAVs or aerial vehicles, or on weather, as well as transmitting mission critical data to a control center, such as live camera or sensor data from for example, but not limited to, public safety, search and rescue missions.

The apparatus 100 comprises at least one input interface 120, e.g. a data interface or a communication interface, configured for acquiring current network-specific coverage data respectively from the plurality of communication networks. Therein, the acquiring may include reception or retrieval of the data, e.g. from the computing nodes.

The apparatus 100 comprises one interface 120 or a plurality of respective interfaces by which the apparatus 100 is connected to one or more computing nodes, such as data servers or streaming servers, from which the current network data or network-specific coverage data of the plurality of communication networks is acquired. The interface may be an internal interface to a memory comprised by the apparatus 100, or an external interface to an external node. For instance, the computing nodes may be operated and/or hosted by respective operators of the plurality of wireless communication networks.

Moreover, the term "interface" refers to an input and/or output processing structure which may include one or more protocol layers defining in which format the data are received or transmitted and how the data are to be interpreted. Such interface may be wired or wireless.

The network-specific coverage data indicates current network connectivity at a location, a subsection or sub-area of the area, or the whole area. As will be described further, the indication of network connectivity may include one or more parameters such as signal power, among others.

For instance, a function or model is acquired which outputs these parameters for a given location or sub-area of the area. Alternatively, apparatus may request parameter values for one or more locations or sub-areas from the computing nodes (via the one or more interfaces 120, which in such case include output interfaces or input and output interfaces).

The apparatus 100 further comprises circuitry 130 configured for combining the acquired current network data from the plurality of networks and for determining, based on the aggregation, plural network data indicating network connectivity at a location in the area.

The location may be any given location in a predetermined area of supply of a plurality of wireless communication networks, such as a current location of the mobile communication device. The plural-network coverage data may be provided for a particular position in the area, along a line such as a path of motion traversing the area, e.g. a plurality of locations or sub-areas along a flight path of a radio-controlled or radio-guided UAV, for the area, or sub-segments of the area.

The plural-network coverage data may include current coverage data indicating a current state of network connectivity at the location, based a current state or configuration of more than one communication network. Like the network-specific coverage data, the plural-network coverage data may include parameter values or a function for outputting these parameter values of indicators of connectivity. However, the plural-network coverage data incorporates an aggregation or other combination of the respective network-specific coverage data, for instance a list or vector of the network-specific parameter values or an aggregation function or logical combination of the respective network-specific values. E.g. an aggregation function may include a minimum or maximum of a parameter, and a logical combination includes logical "OR" or "AND", or compositions of these functions. For instance, a logical operation may include a combination of criteria such as ("parameter A exceeds a threshold AND/OR parameter B exceeds a threshold").

For instance, a parameter N1 indicating connectivity, may be acquired for a respective network for different frequency bands, either as a list of values or as an aggregation or logical combination. E.g., in a single network, frequencies A, B, C, D, . . . , may be used, whereas a combined network-specific coverage may include an indicator of parameter N1 as a combination of A, B, C, D, i.e. N1(A,B,C,D). The combined plural-network for multiple networks may be a combination of N1(A,B,C,D) of a first network with N2( . . . ) of a second network, N3( . . . ) of a further network, etc.

The term "circuitry" refers to processing circuitry such as one or more processors or CPU(s) (central processing unit(s)), and includes hardware components such as ASIC (application specific integrated circuit), FPGA (field programmable gate array), software implementations running on any hardware, or any combination of hardware and software.

Figure 2:
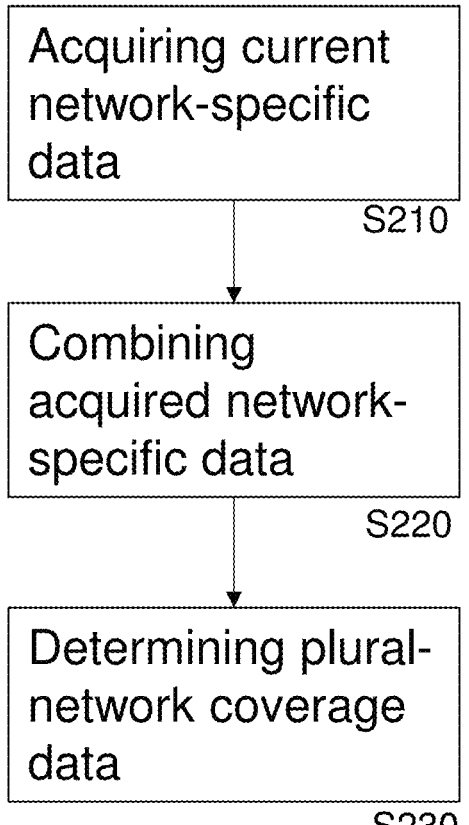
FIG. 2 is a flow chart of a method for computing plural-network coverage data.

In correspondence with the above-disclosed apparatus, provided is a method for computing plural-network coverage data for connecting a mobile communication device to a communication network from among a plurality of communication networks serving an area. As shown in FIG. 2, the method comprises a step S210 of acquiring current network-specific data respectively from the plurality of communication networks. The method further comprises steps of combining S220 the acquired current network-specific coverage data from the plurality of networks, and determining S230, based on the aggregation, plural-network coverage data indicating network connectivity at a location in the area.

With the above-disclosed method and apparatus, the present disclosure enables planning and modeling a current state of an overall connectivity area which is a coverage area of a plurality of communication networks. Accordingly, the disclosure may facilitate satisfying the demands of use cases requiring a high degree of connectivity, redundancy in connectivity, and knowledge of current connectivity state. Examples of use cases include traffic and transport systems such as manned or unmanned aviation, including UAVs (unmanned aerial vehicles) and UTM (UAV traffic management), but are not limited thereto. Other exemplary use cases include connected vehicles such as cars or trucks, advanced driver assistance systems, autonomous driving, factory auto-
mation, internet of things, and, more generally, mobile
communication.

In this disclosure, details, examples and embodiments
shall refer to the apparatuses as well as methods, unless the
context or explicit indication indicates otherwise.

Figure 3:
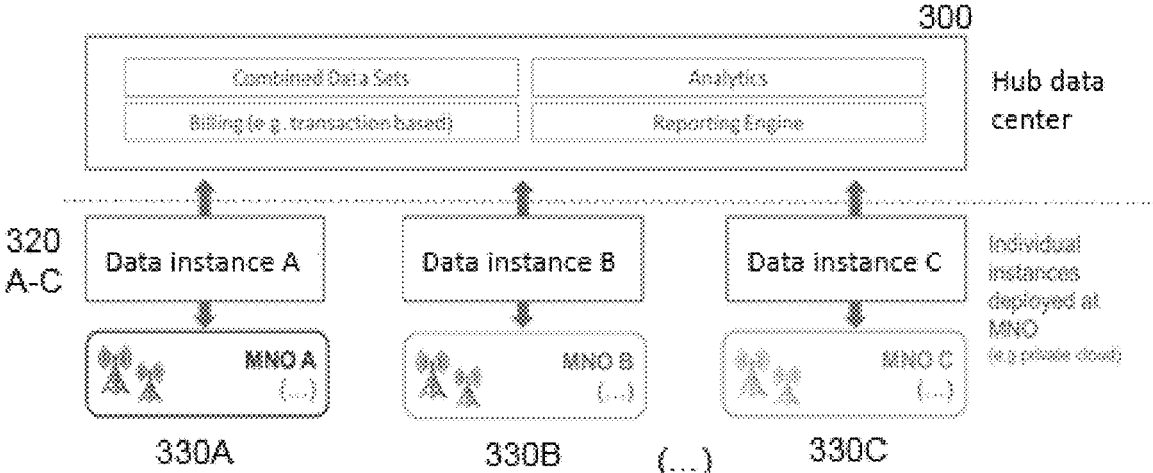
FIG. 3 is a block diagram showing a data processing system including individual data processing instances, a hub data center.

As an example, FIG. 3 shows a hub data center 300 as an
implementation of apparatus 100 which is connected over
respective interfaces to processing nodes 320 A-C, e.g.
private clouds operated by the network operators (mobile
network operators or MNOs) of networks 330A-C. The hub
data center 300 obtains network-specific coverage data, e.g.
single-network data, indicating respectively the connectivity
of the plural networks 330A to 330N from the plurality of
instances 320A-C which process the network-specific cov-
erage data. Although this FIG. 3 shows three MNOs, the
present disclosure is not limited to this exemplary number.

The current network data or current connectivity data may
include any data or information from which a connection
status of the network or one or more network nodes of the
network is derivable. For instance, the connectivity data may
include or be generated based on an indication regarding a
current status of a network node, such as an ON state, an
OFF state, a network configuration, fault network data,
workload, or measurements performed by the network node
or by mobile terminals (possibly including UAVs), current
transmission power at the receiver, a current transmission
direction, directivity (gain minus masking loss), MIMO
(multiple input multiple output) settings, etc., which may be
provided by the operator of the network. For instance, the
one or more input interfaces 120 may connect the apparatus
100 to a processing node (e.g. server) from which the data
(streaming data, "live" data) obtained from a plurality of
communication networks are streamed and updated continu-
ously (e.g. frequently at regular intervals, or whenever new
connectivity data is received by the processing node). Alter-
natively, a plurality of interfaces may be connected respec-
tively to a plurality of processing nodes that respectively
receive the network data of the plural communication net-
works from a plurality of processing nodes.

The plural-network coverage data comprise parameter(s),
metric(s) or indicator(s) which are relevant for indicating or
predicting, for a mobile communication device including a
connected UAV equipped with one or more SIM(s) (sub-
scriber identity module(s)) or LTE (Long Term Evolution) or
5G module, the ability to connect with a wireless commu-
nication network at a given 3D location at a given point in
time.

Furthermore, the received current network data may be
single-network coverage data. For instance, the single-net-
work data indicates current network coverage or connectiv-
ity per network. The single-network data may be determined
respectively by operators of the plurality of communication
networks, which therefore perform the computing of the
current network data in a distributed manner. However, the
disclosure is not limited to each network node providing
coverage data of a single network only. For instance, a
network operator may operate two or more communication
networks of the same or different technology (e.g., LTE,
5G), and the coverage data for these networks may be
processed by and acquired from the same processing or
computing node. In addition, network-specific data of a
single network may be acquired from a plurality of com-
puting nodes, e.g. servers covering different regions of the
area of service.

In some embodiments, circuitry 130 is configured for
comparing, based on the received network data, respective connectivity of a plurality of communication networks at the
location and to select from among the plurality of commu-
nication networks, based on the comparison of the connec-
tivity, a network for connecting the mobile communication
device at the location for which the plural-network coverage
is to be determined. The comparison may include the
above-mentioned aggregation or logical functions or opera-
tions, or their compositions.

Depending on the information which is received from the
plurality of networks as current network-specific coverage
data, different comparisons may be performed. For instance,
connectivity data may be available respectively per network
nodes, wherein the considered network nodes belong to a
plurality of communication networks. Alternatively, an
operator of the networks may aggregate the data of the nodes
of the network beforehand, and apparatus 100 then receives
the single-network data as a function of position and pos-
sibly other parameters such as moving speed or direction of
a communication device. Also, an aggregation for the net-
work nodes of a single network may be performed by
circuitry 130 of the apparatus before comparing the different
networks.

For instance, the plural-network data coverage indicates
network connectivity along two dimensions (2D) or three
dimensions (3D) in the area. Use cases for the 2D connec-
tivity indication include the above-mentioned automatic and
connected driving scenarios, whereas 3D plural-network
coverage indication may be applied to UTM and guidance
and control of UAVs.

For instance, in addition to current network data, the
network-specific coverage data may include or be based on
respective "event data" may of the plurality of communica-
tion networks, which indicates known future events known
to occur at the respective network nodes of the plurality of
communication networks, at time instances later than receiv-
ing the event data. Accordingly, the connectivity data is not
restricted to data describing a current status. In addition,
"event data", e.g. an indication of known future events, may
be received by the second interface, wherein the future
events are known to occur at a point in time later than the
reporting of the events and the reception at the second
interface. Such known future events include future OFF
states of network nodes due to planned maintenance or
repair works, an installation of a new antenna, or a relocation
or removal of an existing network node or antenna. Further-
more, in the case of satellite networks, such known future
events may include the launch or startup of a new network
satellite or a known correction of an orbit of a satellite.

In some embodiments, addition to the current network
data, stored network data may be acquired from at least one
data storage, possibly including or being based on location
data of respective network nodes of the plurality of wireless
communication networks in the area or previously received
or computed coverage data. The computation of plural-
network coverage data may then include correlating the
stored plural-network coverage data and the currently
acquired data network data.

For instance, machine learning such as supervised learn-
ing and/or unsupervised learning may be applied by circuitry
130 of apparatus 100 which computes the plural-network
coverage data, and/or by the respective computing nodes
from which the single-network coverage data is acquired.

The data storage, or plural storages, may be, for example,
a computing or data node such as a server, a database, or a
database server. Moreover, the data storage may be an
internal storage or memory included in the apparatus, or an
external computing node. For instance, the data from the plural networks are stored in a single data storage, or there may be data storages respectively storing the network data of the plural networks.

For instance, the location data, or positional data, indicates the positions of the network nodes. In particular, an indication of the coordinates of the antennas or antenna panels included in the network nodes, possibly including a horizontal position and a height of the antenna panels with respect to the ground or some other reference point, e.g. sea level, a point of origin, etc., may be provided. In the case of terrestrial systems such as LTE, the positions of the network nodes are usually fixed for a given operating duration, wherein the active which are currently in on-state may vary. However, for satellites of a satellite system or other mobile network nodes, the positions of network nodes may vary over time.

Current network-specific coverage data and stored network-specific or plural-network data may be received over the same or respectively different interfaces. For instance, one or more first interfaces are configured to obtain the current network data from the plurality of networks, and one or more second interfaces are configured to receive the stored network data.

As mentioned, the present disclosure may be applied to guidance or control of UAVs as mobile communication devices. Accordingly, in some embodiments, the area is a three-dimensional (3D) flight area within three-dimensional air space, and the mobile communication device is an unmanned aerial vehicle (UAV) guided in the 3D flight area.

In these cases, the plural-network coverage data may be provided as a function of a location along three dimensions. E.g., in the computing of 3D plural-network coverage data, a mapping between a 3D location within the flight area and one or more parameters indicating a predicted connectivity or connectability at the point is determined for a current point in time or a time interval which is sufficiently small to represent a current coverage status of the network. By determining and making the connectivity-related parameter or metric available for the flight area, a current 3D coverage or 3D coverage status of the communication network/system is obtained. For instance, the 3D location is expressed by geographical coordinates such as WGS 84 (World Geodetic System) or ECEF (earth-centered, earth-fixed)/ECR (earth-centered rotational) coordinates.

The flight area is not limited to any particular area size, and may range, for instance, from an urban area to an area equal to or larger than the state area of, e.g., Germany (which is 357 386 km²). For air traffic of UAVs, the height may typically range from ground level to a maximum flight altitude or height which may limited by law or regulations. Exemplary mandated maximum flight heights for UAVs are 400 feet above the ground in the USA and about 150 meters above the ground in Europe (see references Fact Sheet— Small Unmanned Aircraft Regulations (Part 107), Federal Aviation Administration (2016), https://www.faa.gov/news/fact_sheets/news_story.cfm?newsId-20516 and UAS ATM CARS Common Altitude Reference System Discussion Document, European Organisation for the Safety of the Air Navigation (2018), https://www.eurocontrol.int/sites/default/files/2019-05/uas-atm-cars-v1.0-release-20181127_0. pdf, the disclosures of which are hereby incorporated by reference in their entireties).

However, the above-mentioned regulations are merely exemplary rather than limiting with respect to the flight area or height for the applicability, as UAVs may in principle fly significantly higher.

For instance, the at least one input interface (or one of the interfaces if there is a plurality) may be configured for acquiring a result of a connectivity measurement performed by the UAV or a communication device different from the UAV, e.g. a connected vehicle.

For instance, a UAV may provide, over an uplink control channel of a wireless communication network, channel measurements to the network, which are then reported, via the input interface(s) 120, to the apparatus 100. Current measurement results, if frequently or regularly provided, may facilitate validating, checking, or updating the current 3D coverage data as well as the current and stored network data at a position from which the UAV has reported the measurement. For instance, a model on which network-specific and/or plural-network coverage data is computed may be calibrated or "tuned based on measurements", possibly including machine learning.

Current network data may also include measurements from the running system which are conducted in the network directly, e.g. by means of network probes that monitor the respective interfaces. Such network data is continuously monitored for each IMSI (International Mobile Subscriber Identity), which uniquely identifies respective users of a wireless network. To this end, call trace technologies may be implemented by the operators of the wireless networks. Therein, information about performance of the network generated by the mobile terminals or communication devices, such as reports of connection failure, are collected by the operator on a server or some other entity. Thus, such data can be derived for each UAV or other communication terminal in the network that embodies a SIM (subscriber identity module) card for communication as well as identification. Moreover, the data about performance may be combined with positional data of the reporting mobile communication device. Accordingly, in addition or alternative to measurements by UAVs or connected vehicles, the current network data may include measurements performed by one or more other communication terminals or UEs (user equipment) different from UAVs, such as mobile phones or tablet computers.

Measurement results from UAV(s) and/or from the running system may be acquired by apparatus 100 or by computing nodes from which the network-specific coverage data is acquired. For instance, measurement result of measurements performed by UAVs may be acquires from network operators, aviation authorities, or UTM systems.

The measurement may include a measurement of channel quality, signal power or strength, interference, signal to noise ratio (SNR), signal to interference and noise ratio (SINR), or some other quantity related to signal power and, more generally, connectivity. E.g., the measurement may be based on reference signal or data signal.

The result of the connectivity measurement may be called a current result which represents a current status of connectivity at the location. Accordingly, latency between measurement and acquiring of the result shall be kept low.

In addition to the result of the measurement, an indication of the location within the flight area where the measurement has been performed may be received. For instance, the location may be measured by means satellite navigation such as GPS (Global Positioning System) or by deriving the location of the measuring device relative to a plurality of radio network nodes from the signal strength(s) of the signals received from the respective nodes. However, in some cases, the location may be known or determined by the apparatus 100, e.g. by circuitry 130, without receiving an indication, for instance if the measuring device is stationary or if a flight path of a UAV is known in advance.

In some embodiments, the plural network coverage data are automatically transmitted or reported to an aviation control node, e.g. for guiding one or more UAVs, wherein the guiding may include granting an air-traffic control clearance for the three-dimensional flight area or for performing control of the UAV. For example, apparatus 100 includes, in addition to the above-input interface(s), an output interface (or a plurality of output interfaces) configured for automatically reporting the plural-network coverage data to one or more aviation control nodes.

In this disclosure, the expression "guiding a UAV" or "guiding UAVs" generally refers to command and/or control operations in UAV traffic management and control. For instance, guiding of UAV(s) includes at least one of the permission and prohibition of UAV flights in the flight area or a subsection of the flight area, granting of air traffic control clearances, or the issuance of warnings regarding UAV operability in the flight area or subsections of the flight area. Such operations may be performed by aviation authorities. In addition or alternatively, guiding of UAV(s) may further include at least one of the planning and determination of flight paths or a corridor in the flight area for a UAV flight in advance of a flight of a UAV as well as control and navigation during the UAV flight or flying operation. Therein, the control and navigation may include following a previously determined flight path as well as deviating from the previously determined flight path in view to a current or recent change in network connectivity or other conditions, e.g. weather, in the flight area. "Guiding UAVs" may further include providing data for guiding.

For instance, if a plurality of UAVs are being operated, the connectivity measurement may be performed by one of the plural UAVs. The UAVs which are guided may include the UAV that has made the measurement and may further include different UAVs. Accordingly, based on an anomaly detected based on a measurement by one UAV, a guiding operation or decision may be made for the same UAV and/or one or more different UAVs.

The aviation control nodes comprise nodes operated by one or more of aviation authorities, ATM (air traffic management) systems, UAV service providers, UTM systems, or UAV control centers. The current 3D coverage data may be reported to one or more aviation control nodes including the above-mentioned examples. The one or more aviation control nodes may include server, client, or data base, or cloud. Computing apparatus 100 and the aviation control node which performs air traffic control clearance or UAV control may be integrated, e.g. hosted by a single server or commonly operated by an aviation authority. Alternatively, for instance computing apparatus may be operated by an aviation data service provider on a processing node or server remote from the aviation control node of an aviation authority or UTM system provider.

It should be noted that in some cases, a communication network and an aviation authority or UTM system may be operated by a common operator. Accordingly, plural-network coverage data may be transmitted to the same processing node from which network-specific coverage data over respective input and output interfaces or an integrated input-and-output interface.

Further, apparatus 100 may be operated by and/or deployed at one or more of a service, operator or institution such as communication network operator, an aviation service such as aviation authority, UTM system, or a data processing service providing coverage data for an aviation service, depending on where, e.g. at which of these services, stored and current network data is available.

Furthermore, processing for determining the current plural-network coverage data may be split between or distributed among one or processing nodes operated by a network operator, an aviation authority or UTM service, UAV service provider and an intermediate data processing service such as a hub data center between the network operator and the aviation/UAV operator. In such a case, apparatus 100 may constitute a processing system comprising a plurality of processing nodes.

In particular, based on the 3D network-specific or plural-network coverage data, an aviation authority, as an example, may be enabled to assess in which parts of the flight area the signal quality is sufficient for granting air traffic of UAVs in particular BVLOS. Accordingly, the aviation authority is enabled to grant an air traffic control clearance for the flight space or parts of the flight space for which a sufficient signal power has been determined.

Moreover, if the 3D coverage data is reported to a UAV control center (e.g. operated by a UAV service provider), the UAV control center is enabled to determine and optimize a flight path or flight paths of UAVs controlled by the UAV control center and/or operated by the UAV service provider.

Accordingly, the present disclosure provides for automatic data transfer to aviation control centers, control systems/devices, UTM systems and similar facilities. This facilitates an exchange of information about safe areas (e.g. sub-areas of the flight area) where signal quality and/or coverage is sufficient for performing flight operations of UAVs. Accordingly, such information becomes available for flight planning and optimization and may contribute to safety in aviation, particularly for UAVs. E.g., UTM may determine an optimal flight path based on the 3D information. For instance, the optimal path as a path having continuous coverage of at least a certain quality or signal strength or the like. Further supplementary criteria for the determination of an optimal flight path may be a change probability or handover probability of the connected network node, which will be described below, a number of handovers, roaming costs, etc.

Figure 4:
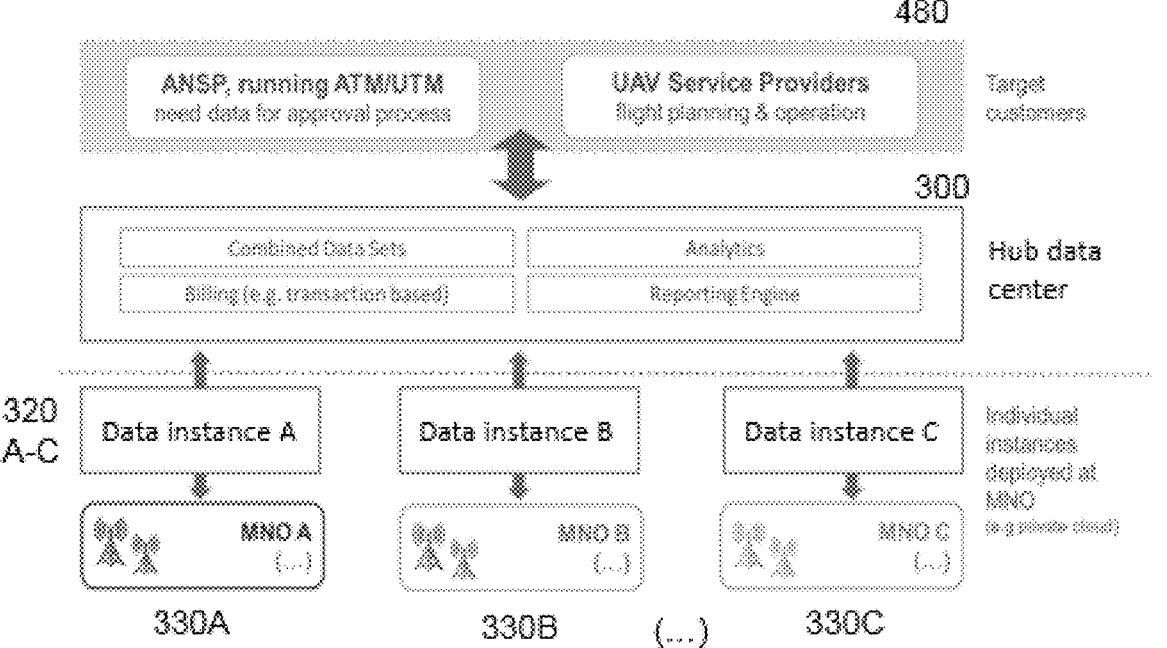
FIG. 4 is a block diagram showing a data processing system including individual data processing instances, a hub data center, and an air navigation service provider.

An example of reporting the plural network data to an aviation control node is shown in FIG. 4. In the Figure, the system of FIG. 4 is shown, with an additional interface embodying the "third" interface which connects hub data center 300 to an aviation control node 480. Here, aviation control nodes such as an ANSP (air navigation service provider), air traffic management (ATM) or UTM system and UAV Service Providers are shown as exemplary recipients of the plural-network coverage data.

The ANSP may utilize the plural-network coverage data for approval processes such as air traffic control clearances, and the air traffic service provider may utilize the plural-network coverage data for flight control and flight planning of flights of UAVs.

In some embodiments, the plurality of communication networks include a plurality of terrestrial radio networks operated by a plurality of network operators. E.g., the plurality of networks may include networks of the same standard (such as LTE, 5G).

In addition or as an alternative, in some embodiments, the plurality of networks may include at least one of a terrestrial radio network and a satellite radio network. Accordingly, examples of the plurality of communication systems include one or more terrestrial radio networks implementing systems such as 4G, LTE, LTE-Advanced, "ultra long range" LTE systems which also provide airplanes travelling at 10000 m altitude with broadband internet connections, 5G (e.g. 3GPP New Radio, NR) possibly operated by different operators, or further developments of such systems particularly adapted to the requirements of aviation, satellite radio networks, in particular LEO (low earth orbit) systems providing a sufficiently low latency, hybrid systems which include both earth-based as well as satellites or other air or space travelling network nodes. In addition to or instead of satellites, a communication system may have aerial vehicles such as airplanes or gas balloons, or UAVs as network nodes.

Accordingly, the present disclosure may facilitate increasing network redundancy and the density of available network nodes as well as facilitate provision of a stable connection network connection. By acquiring stored and/or current data from a plurality of communication networks or systems, a UAV or autonomous car may be enabled to select a network node for connecting from a larger number of network nodes. Such redundancy may facilitate extending 2D or 3D coverage, maintaining connectivity during a UAV flight or autonomous driving operation, and increasing safety in UAV operation. Moreover, the inclusion of different systems from among terrestrial, satellite, and hybrid systems may facilitate enhancing the coverage at different locations of the 3D, e.g. at different flying heights of UAVs or in regions such as mountains or water bodies where the number of earth-based network nodes is low.

For instance, the current plural network coverage data include at least one of a prediction of a current signal power, signal strength, or a related parameter such as SNR (signal to noise ratio), or SINR (signal to interference plus noise ratio), interference, an indication a current number of communication terminals per area unit, and an indication of a handover probability of handover by the mobile communication device from one network node to another network node. For instance, the plural-network coverage data include a prediction or estimation of a current value of one or more of these parameters.

E.g., at given position in the coverage area, the signal power of the network from among the plurality of networks or network node having the strongest signal is output from the determination of the plural-network coverage data.

However, the plural-network coverage data is not limited to a signal power or related parameter. As mentioned above, the current plural-network coverage data may also include a handover probability or of handover by the mobile communication device from one network node to another network node, or change probability of a change of the network node, with which a UAV is currently connected. The change probability is a probability with which the UAV will switch connections from one network node to another network node.

The provision of a change probability, which may also be called handover probability or switching probability, from one network node to another, may facilitate the choice of a stable and lasting connection particularly when the connected device such as a UAV is moving in air space at a certain height (e.g. 150 m) above ground. This is because at such height, a plurality of network nodes possibly having similar signal powers may be identified by the UAV, depending, e.g., on topography, network design, and position of network nodes as well as of the UAV. Moreover, a UAV may not necessarily change or switch network nodes immediately whenever another network node is detected to have a stronger signal power than the network node to which the UAV is currently connected. For instance, to prevent too frequent switching, a change of network nodes may be performed only when the signal of the other, unconnected network node is determined to be significantly stronger for a given time interval.

For instance, the handover probability may be dependent on at least one of a location, a moving speed, a moving direction, and an envisaged or planned route, flight path or trajectory of the UAV or car.

For instance, for a mobile receiver (e.g. UAV or an autonomously driving vehicle) to change from one network node A (best serving network node) to another network node B, the signal received at the UAV from network node B has to exceed the signal level network node A by a defined threshold, a delta greater than zero. Also, this signal has to be continuously better for a defined time interval. Only if the received signal from Node B is better by a defined signal delta—a handover-threshold—for the duration of a given time, the serving node will be changed.

Based on the above-mentioned or other rules for a handover or change between network nodes, a change probability may be predicted by comparing the signal strengths of different network nodes in the flight area or along a planned or flight path or a plurality of possible flight paths of an UAV. Alternatively, the determination of a change probability may be based on a count of handovers of UAVs which have actually been performed per area in a given time interval.

Alternatively, rather than outputting a handover probability, the determination of a signal power may take into account the above-mentioned handover threshold or a bias towards the network node with which the mobile communication device is currently connected.

In wireless networks, the change of serving nodes is one of the dominant risks for connectivity loss. Therefore, for fast moving UAVs, who have a very different visibility to signals from various network nodes—compared to terrestrial users, the 3D areas with high probability of network node changes are less suitable for safe UAV BVLOS operation. Thus, the provision of a change probability of a change of connections of a UAV among network nodes may facilitate determination of safe regions for UAV traffic within the 3D flight area.

The provision of the change probability (or a probability of handover between network nodes/cells) of a currently connected network node may facilitate optimization of flight paths by UAV service providers in view of a stable connection and or in view of saving energy and processing power otherwise needed for monitoring the signal strengths of network nodes or switching operations.

For instance, different handover probabilities may be determined, including a single-network handover probability and a plural-network handover probability. For instance, the single-network handover probability may be used as a preliminary criterion for reporting to a UAV aviation node, and if it exceeds a given threshold, the plural network handover probability is used. Staying connected with a single network as long as possible may be advantageous in view a stable connection as well as billing.

Accordingly, in some embodiments, the handover probability includes at least one of an intra-network handover probability of handover within one communication network from among the plurality of communication networks and an inter-network handover probability of handover between respectively different communication networks from among the plurality of communication networks.

The current network-specific coverage data from the plurality of communication networks may be acquired in a common data format. However, the disclosure is not limited thereto, and the data format as well as the information provided from the plurality of communication networks may differ.

The data format may be in CSV (comma separated values), XML (Extensible Markup Language) or equivalent.

Some examples of the current network data, based on which the single-network coverage data is determined, may include but are not limited to of network nodes of the respective communication networks:

Node data or node location data such as Market ID (for the location of the network node); eNodeB ID (network node identification in LTE); Sector Number; eNodeB Name; eNodeB Activity Status; Network node Longitude; Network node Latitude; Network node Altitude; Cell ID (network specific identification of the respective network node); eCGI (E-UTRAN Cell Global Identifier—for unique global identification of the network node); Physical Cell ID; Height of the Antenna position; Antenna (type, name), Antenna Gain; Antenna Azimuth (in degrees relative to absolute north); Antenna Mechanical Downtilt (in degrees relative to the horizontal plain); and Antenna parameters or transmission/reception characteristics, such as Reception losses (dB—decibel); Transmitter Transmission losses (dB); Transmitter Max Power (dBm—decibel relative to a Milliwatt); EPRE (Energy Per Resource Element) per antenna port (dB); Total ERP (effective radiated power, W—Watt); Total EIRP (equivalent isotropically radiated power, W).

Regarding the above mentioned node data and node location data, some of the included information may be provided as current network data although location data of network nodes is already included in stored network data. However, for stationary network nodes, provision of node or node location data in the current network data may facilitate validating and/or updating the stored network data or the current connectivity state of the network nodes. Furthermore, for moving network nodes such as satellites, the stored network data may for instance include an indication of a planned path of motion of the node, or previous positions of the node, whereas the current network data indicates a current position.

Furthermore, as mentioned, the plural-network coverage data may include an indication of a number of communication terminals per unit area, e.g. a local density of communication terminals.

For instance, a current number or an aggregated number of communication terminals per unit area, which is aggregated over a period of time, is provided. The current number of communication terminals per area is reported to the aviation control node, in addition to or included in the 3D coverage data. Such a number of communication terminals per area unit or local density may be determined by computing or collecting positions of communication devices or terminals in a cellular network. Accordingly, by determining a local communication terminal density, a "traffic density map" may be provided, representing highly populated areas, e.g. areas where many people are. Such information may vary over time, as people commute and move over the period of a day, etc.

The information on where people are however may be of very high interest to so called SORA (Specific Operations Risk Assessment) processes for unmanned aviation flight path planning and approval processes. If there is a high risk to cause any damage to people, this area may be decided to become a less preferred area for a UAV to fly over. Providing such data to UTM systems, in addition to the connectivity information, may therefore facilitate increasing the safety of the UAV operation.

For instance, an indication of a network-specific number of communication terminals per unit area may be included in the network-specific coverage data, and circuitry 130 may combine the respective network-specific local density of communication terminals to obtain a plural network density. However, the density of a plurality of communication terminals may also be received in an aggregated manner.

As mentioned, the aggregation or combination of the acquired current network-specific coverage data may for example include a comparison of respective connectivity of the plurality of communication networks. Either in addition or as an alternative to such a comparison, the aggregation of the acquired current network-specific coverage data for obtaining plural-network coverage data may include at least one of the following operations:

A logical combination, for example "OR" and "AND", of 3D areas (parts of the area served by the plurality of networks) representing sufficiently good signal power or strengths for individual network layers (e.g. frequency bands) of the same network or different networks;

A logical combination, for example "OR" and "AND", of 3D areas representing sufficiently good signal strengths with 3D areas representing sufficiently good interference or other performance criteria, such as handover probability, etc. within the same network or different networks;

A logical combination, for example "OR" and "AND", of 3D areas satisfying sufficient individual or already combined performance requirements such as signal strength, interference, handover probability in the same network, or different network layers, and/or different networks;

Any logical combination, for example "OR" and "AND", or threshold based combination of 3D areas, such as threshold based inter-network handover areas, or cost based network selection, in different networks and network layers;

Any enrichment of the combination of the 3D information with billing information, for example for enabling a connectivity cost optimized routing in various network layers and networks;

Any combination, for example logical "OR" and "AND" of different individual groups of combinations. For example, finding a 3D area representing the area where the connectivity is good enough in one of the network layers from different networks:

Condition A

Minimum required signal strength (MSS-N1f1) in network (N1) at frequency band (f1) is achieved, AND (logical AND)

Minimum required interference levels (MIL-N1f1) in network (N1) at frequency band (f1) is achieved Plural network condition: OR (logical OR)

Condition B

Minimum signal strength (MSS-N2f2) in network (N2) at frequency band (f2) is achieved, AND (logical AND)

Minimum interference levels (MIL-N2f2) in network (N2) at frequency band (f2) is achieved If the "plural network condition" would be "AND" (logical AND), the minimum requirement for plural network redundancy would be stated.

By outputting 3D coverage data such as plural-network coverage data including the above-mentioned parameters such as a signal power and a handover probability, an operator of UAV traffic or a UAV service is enabled to find an optimized flight corridor and/or flight path for a desired destination and/or for a rough flight path input. This may be performed by minimizing a cost function including at least one of these above mentioned parameters or additional parameters (e.g. energy consumption of UAVs, desired flight altitude, roaming costs, etc.,) in order to obtain the optimum path or desired path or a corridor within the flight area with acceptable features, or the like. Operation of the aviation system, e.g. UAV flight scheduling and controlling and determination of flight paths or flight corridors for the UAVs and controlling of the UAVs within the corridor or on the flight path may be performed based on the optimization.

Figure 5:
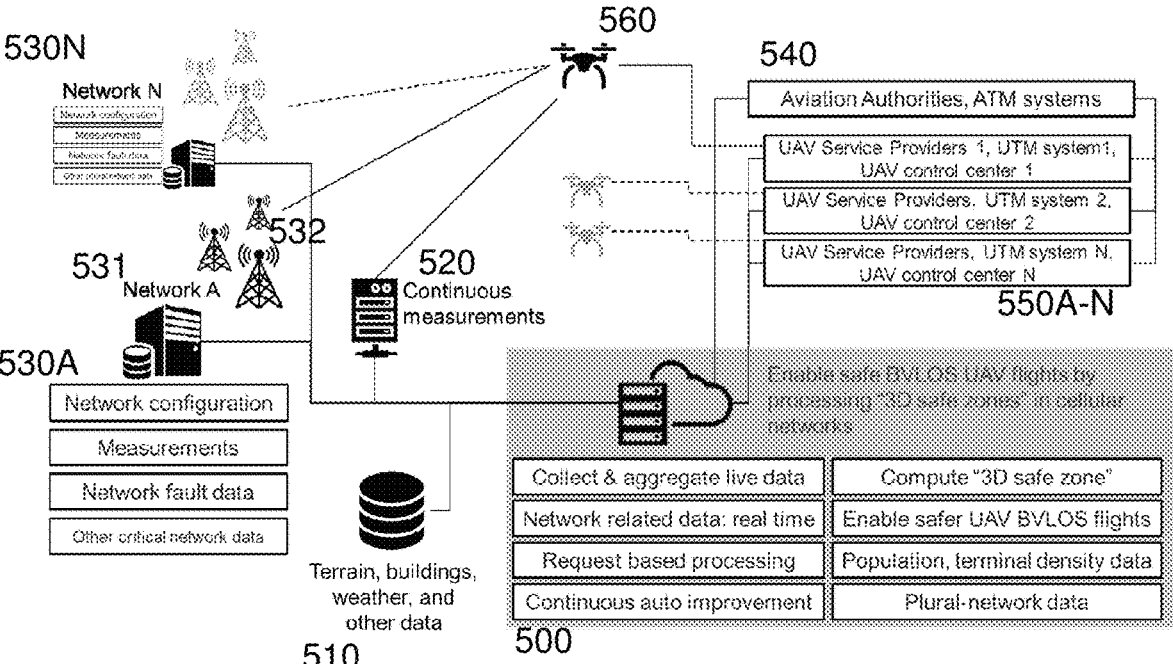
FIG. 5 is a block diagram showing a control system for UAV air traffic.

FIG. 5 shows an exemplary system for guiding UAVs, wherein the processing node 500 is connected, over a plurality of interfaces, to a plurality of networks (Network A . . . , network N) 530A-N respectively including a network server 531 and network nodes (base station including transmission/reception antennas) such as network node 532, an Aviation Authorities or ATM system as aviation control node 540, a plurality of UAV service providers 550A-N, a data server 510 or database server storing data, about terrain (topography), buildings, weather, and other data, as well as a data processing server 520, continuously or regularly receiving and forwarding (current) measurements (e.g. signal, channel measurements) from one or more UAVs (including UAV 560). In FIG. 5, apparatus processing node 500 is shown as a server of a cloud computing service.

In the system shown in FIG. 5, the apparatus for computing plural-network coverage data corresponds to processing node 500, which, in this case, embodies hub data center 300 shown in FIGS. 3 and 4. Individual data instances which provide the network-specific coverage data may be included in the respective processing nodes of the network, such as node 531.

The structure of nodes (e.g. servers) and connections/interfaces between nodes as shown in FIG. 5, as well as the usage and numbering of the term "interface" not used in a limiting manner in the present application. For instance, stored data may be obtained an internal interface to a data storage comprised by apparatus 100, or an external interface to an external database. Moreover, the stored data may be regularly updated, for instance by new network information received from network operators and/or by feedback from the above-mentioned machine learning process.

In addition to the above-described apparatus and method for computing plural-network coverage data, further provided is a guiding node and a guiding method.

Figure 6:
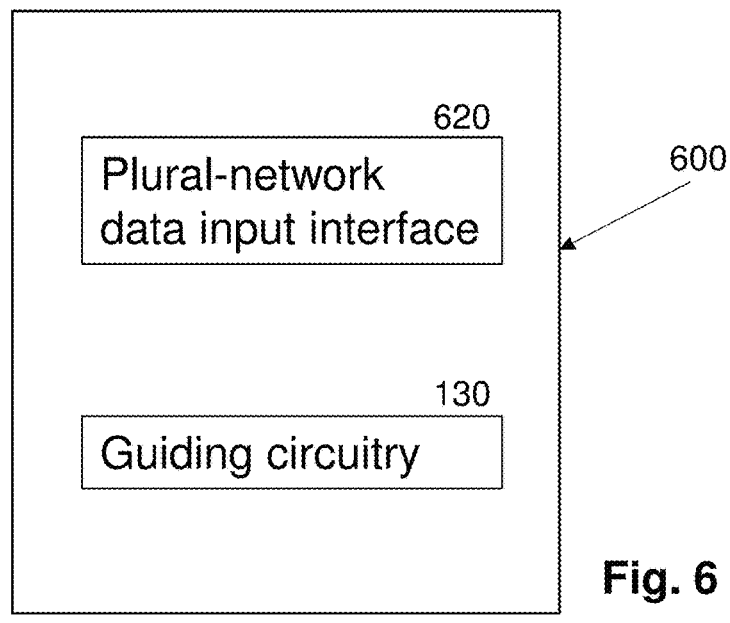
FIG. 6 is a block diagram of a guiding node.

As shown in FIG. 6, guiding node 600 comprises an input interface 620 configured for acquiring plural-network coverage data for connecting a mobile communication device to a communication network from among a plurality of communication networks serving an area. The plural-network coverage data indicates current network connectivity at a location in the area and is determined based on an aggregation of current network-specific coverage data from the plurality of communication networks. The guiding node 600 further comprises circuitry 130, e.g. guiding circuitry, configured for performing guiding of the mobile communication device based on the acquired plural network coverage data.

Figure 7:
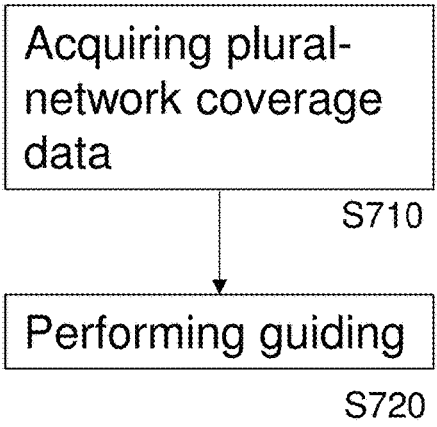
FIG. 7 is a flow chart of a guiding method.

Correspondingly, as shown in FIG. 7, the guiding method includes acquiring S710 plural-network coverage data for connecting a mobile communication device to a communication network from among a plurality of communication networks serving an area. The plural-network coverage data indicates current network connectivity at a location in the area and is determined based on an aggregation of current network-specific coverage data from the plurality of communication networks. The guiding method further comprises a step of performing guiding S720 of the mobile communication device based on the acquired plural-network coverage data.

As mentioned above, the mobile communication device may comprise a vehicle such as a connected car, or any other communication device configured for receiving guiding or navigation via a radio communication network. Guiding a connected car may include navigation as well as outputting warnings or commands, such as, in case of an autonomous vehicle, a command for handover from automatically driving to driving control by a human driver.

Further guiding node 600 may be an aviation control node for guiding an unmanned aerial vehicle, UAV, in a three-dimensional flight area within air space, Here, "guiding UAVs" may correspond to the above description. Guiding also comprises providing data for guiding.

For instance, in the case of guiding UAVs, the guiding node 600 may correspond to a computing node at an ANSP, aviation authority, UAV service provider or UTM system, such as aviation authorities/ATM systems 540 and UAV service providers/UTM systems 550A-N shown in FIG. 5 or aviation control node 480 shown in FIG. 4.

In this disclosure, an interface may comprise a plurality of physical or virtual interfaces. For instance, the at least one input interface 120 may comprise one or a plurality of interfaces to a plurality of data nodes from which different data (e.g. continuous measurements by UAVs, weather data, network data) are received. Likewise, apparatus 100 may comprise one output interface or a plurality of interfaces to one or more among aviation authorities, ATM systems, and one or more UAV service providers (UAV control centers/UTM systems).

Moreover, the term "interface" refers to an input and/or output processing structure which may include one or more protocol layers defining in which format the data are received or transmitted and how the data are to be interpreted. Such interface may be wired or wireless.

As mentioned, apparatus 100 acquires current network-specific coverage data respectively from a plurality of communication networks. In the following, an example of calculation of such network-specific coverage data will be provided.

An exemplary model for estimating coverage based on current and stored network data may include the following path loss and link budget equation (1) for determining a power of a signal at a receiver (e.g. a UAV on a flight path in the flight area) at a given location:

$$P_R = P_T + G(\varphi, \theta) - PL(d, h), \qquad \text{equation (1)}$$

where
  $P_R$ is the power at the receiver (dBm, decibel-milliwatts);
  $P_T$ is the (transmission) power of the transmitter/antenna/cell (dBm);
  d is the distance between transmitter and receiver in meters;
  h is the height above ground (flight height) of the UAV in meters;
  $\varphi$ and $\theta$ are the relative azimuth and elevation (view angles) of the UAV, as seen from the cell (e.g. taking the mechanical tilt/antenna tilt and azimuth into account); and $G(\varphi,\theta)$ is the directivity (gain minus masking loss) of the cell/antenna; and $PL(d,h)$ is the path loss.

For the determination/estimation of the path loss, a general model in accordance with the following equation (2) may be used:

$$PL(d,h)=(\alpha_1+\alpha_2\cdot\log(h))\cdot\log(d)+\beta_1+\beta_2\cdot\log(h) \qquad \text{equation(2)}.$$

The coefficient $\alpha_2$ is negative (forced by constraints in the tuning process), so the path loss exponent $\alpha(h)=(\alpha_1+\alpha_2\cdot\log(h))\cdot\log(d)$ is decreasing with increasing height. $\beta_2$ can be both positive and negative. In order to prevent the model coefficients dropping below the coefficients of a free space model at a given height $h_0$, for $h>h_0$, the coefficients are fixed with their value at $h_0$, $\alpha(h)=\alpha(h_0)$ and $\beta(h)=\beta(h_0)$ for $h\geq h_0$. This fixing of coefficients may prevent the model from underestimating the path loss at large heights.

For instance, the following coefficients from equation (3) are derived from tuning with UAV measurement data. They may be used in a default model, i.e. in an area where no measurement data is available as input into the system, for the frequency of 800 MHz:

$$PL(d,h)=(27.105-1.63149\cdot\log(h))\cdot\log(d)+31.3353+$$
$$0.735305\cdot\log(h) \qquad \text{equation (3).}$$

For other frequencies, frequency-correcting terms are applied to the constant coefficients $\alpha_1$, $\alpha_2$, $\beta_1$, and $\beta_2$ of the model.

Based on more measurement data available, and more advanced models being developed, additional coefficients and model components describing physical behavior may be added.

Figure 8:
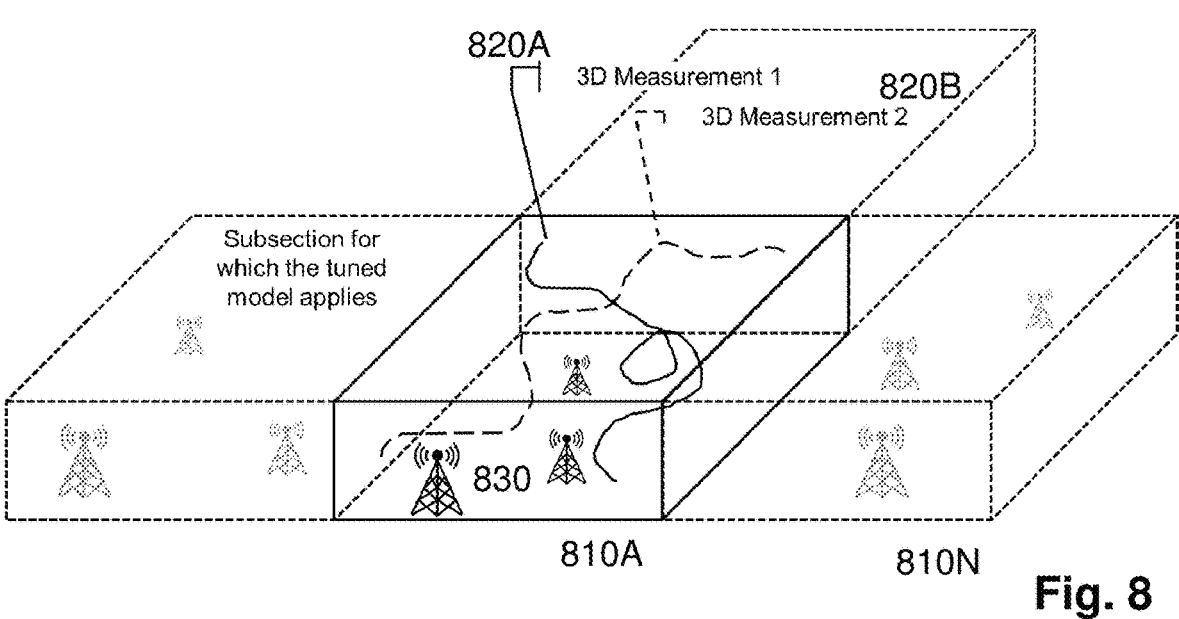
FIG. 8 is a graph showing a division of a flight area into sub-areas.

The three-dimensional area may subdivided into a plurality of sub-areas (or subsections), and current 3D coverage data is computed respectively for the plurality of 3D sub-areas (or area elements) of the flight area. An example of a division of the flight area into sub-areas is shown in FIG. 8. As can be seen, the subsections may have a substantially cube or cuboid shape (seen in a flat map/projection of the earth surface). For instance, cuboid may have sizes of 10 km×10 km (horizontal directions)×500 m (vertical direction), although the disclosure is not limited to particular sizes of subsections, and larger or smaller subsections may be used as well. For instance. Although not shown in FIG. 8, there may be one or more layers of cubes in vertical direction, such as a lower layer comprising takeoff and landing heights and a higher layer comprising travelling heights.

Furthermore, there may be a hierarchically layered division or partition of the flight area into sub-areas. For instance, a first layer of sub-areas may be "tiles" of 1° by 1° in longitude and latitude in WGS 84 coordinate system, which equals about 60 nautical miles in each direction at the equator. These tiles may then, as a second hierarchical layer of sub-areas, further be subdivided into subsections or "sub-tiles" (the size of which may be, e.g., the above-mentioned 10 km×10 km×500 m). In the following, it is described with reference to FIG. 8 how such a subdivision of the flight area may be applied to model calibration or model tuning. For instance, the cuboids depicted in FIG. 8 as sub-areas may be the above-mentioned subsections of the WGS-84-1-by-1-sized tiles.

For instance, these tiles or the flight area may be divided into subsections or sub-areas for tuning, depending on where there are measurements available. If a new measurement is received, for instance in a measurement file, a 3D bounding rectangle or cuboid is generated around these measurements as a sub-area, and in this sub-area, the modelling specifically to these measurements is done. This very specific model is then applied to all the network nodes included in that bounding rectangle or cuboid. Hence, the modelling accuracy is enhanced in this sub-area for which the measurements have been obtained. In addition, the tuning with these measurements may also be applied for other regions in the flight area or the entire flight area. Accordingly, even in places or regions from where no measurements are available, the models are incrementally enhanced, but in the subsections or sub-areas where the measurements are actually performed, the accuracy will be greater.

Based on more measurement data available, and more advanced models being developed, additional coefficients and model components describing physical behavior may be added.

In case that measurement data is available in a specific subsection or sub-area of the 3D airspace, dedicated advanced algorithms and machine learning methods may be applied to automatically enhance the model by tuning it with the respective measurement data.

FIG. 8 shows an example where a 3D airspace is divided into subsection 810A to 810N. In subsection 810A radio signal measurements in 3D are available, 820A and 820B. The model within subsection 810A will now be tuned using measurement 820A. Then, this model will be applied to the network nodes 830, which are within the subsection 810A.

The subsection could also be adaptively formed around the first available measurement 820A, such that the subsection is defined by a bounding rectangle around the measurements.

With the availability of more measurements within subsection 810A, such as 820A and 820B, machine learning algorithms will enhance the tuning accuracy and reliability by means of Supervised Learning methods.

Supervised learning in this context is the machine learning task of learning the function that maps the measurement input data to the output of the tuned output modelling. It infers the model function from the labeled training data consisting of the measurement data and the output model. With each additional input data the algorithms analyze the historical training data together with the new data samples and produces an inferred function that will then be used for the processing of new examples.

For instance, measured values of a parameter such as a signal power are input into the machine learning process. As an output, a model of the signal power is provided, which is based on previously received stored data of the signal strength and updated with each newly received current measurement value or data item. Furthermore, constraints such as weather, current state or configuration of the network, or terrain may be input into the learning process.

In subsections where no measurement data is available, such as 810N, models will be applied to the respective network nodes within that subsection, which are based on a plurality of measurements available for other subsections, as exemplified above by equation 3, but not specific to the targeted 3D sub-area or subsection.

Accordingly, model tuning, as disclosed, is applicable if an increase measurements is expected in the future. Namely, in an incremental way, by automatic learning mechanisms, the models will get better, i.e. more accurate and more reliable, whenever a new measurement is performed and new measured data is obtained. Applicable to all sites in the "tiles", and specifically the case in the sub-tiles (subsections).

In case that measurement data is available in a specific subsection or sub-area of the 3D airspace, dedicated advanced algorithms and machine learning methods may be applied to automatically enhance the model by tuning it with the respective measurement data.

It should be further noted that in this application, "UAV" generally refers to aerial vehicles which are not controlled by an on-board pilot. However, a UAV may for example carry cargo, optical or other measurement equipment (e.g. a camera), as well as passengers (e.g. an air taxi).

Summarizing, provided are an apparatus and a method for computing plural-network coverage data for connecting a mobile communication device. The apparatus comprises an input interface configured for acquiring current network-specific coverage data respectively from the plurality of communication networks and circuitry configured for combining the acquired current network-specific coverage data from the plurality of communication networks and for determining, based on the combination, plural-network coverage data indicating current network connectivity at a location in the area. Further provided is a guiding node and a guiding method. The disclosed techniques may facilitate providing redundancy in connectivity for use cases having high demands on connectivity, including guidance and operation of unmanned aerial vehicles (UAVs).

The invention claimed is:

1. An apparatus for computing plural-network coverage data for connecting a mobile communication device to a communication network from among a plurality of communication networks serving an area, wherein the plurality of communication networks includes communication networks of the same standard operated by a plurality of network operators, comprising:

at least one input interface configured for acquiring current network-specific coverage data from the plurality of communication networks;

circuitry configured for combining the current network-specific coverage data from the plurality of communication networks to provide a combination, wherein the combination comprises a logical combination comparing the current network-specific coverage data from the plurality of communication networks, a vector aggregating the current network-specific coverage data from the plurality of communication networks, or any combination thereof, and for determining, based on the combination, plural-network coverage data indicating current network connectivity at a location in the area; and an output interface configured for automatically reporting the plural-network coverage data to an aviation control node, wherein the plural-network coverage data indicates network connectivity along three dimensions in the area, and wherein the area is a three-dimensional (3D) flight area and the mobile communication device is an unmanned aerial vehicle (UAV) guided in the 3D flight area, the UAV being separate from and different from each base station of a plurality of base stations included in the plurality of communication networks, wherein the plurality of communication networks including the plurality of base stations includes a first communication network including a plurality of first base stations and a second communication network different from the first communication network and including a plurality of second base stations, wherein each second base station of the plurality of second base stations is different from each first base station of the plurality of first base stations, wherein the first communication network is associated with a first carrier and the second communication network is associated with a second carrier different than the first carrier wherein a transition from the first communication network associated with the first carrier to the second communication network associated with the second carrier is operable by roaming within a same region covered by the first communication network associated with the first carrier and the second communication network associated with the second carrier in the 3D flight area, and wherein the first carrier is associated with a first operator and the second carrier is associated with a second operator different than the first operator.

2. The apparatus according to claim 1, wherein the circuitry is configured for comparing, based on the current network-specific coverage data, respective connectivity of the plurality of communication networks at the location and to select, based on comparing the respective connectivity of the plurality of communication networks, a communication network for connecting the mobile communication device at the location from among the plurality of communication networks.

3. The apparatus according to claim 1, wherein the at least one input interface is configured for acquiring a result of a connectivity measurement performed by the UAV.

4. The apparatus according to claim 1, wherein the plurality of communication networks includes a plurality of terrestrial radio networks operated by a plurality of operators.

5. The apparatus according to claim 1, wherein the plurality of communication networks includes at least one of a terrestrial radio network or a satellite network.

6. The apparatus according to claim 1, wherein the plural-network coverage data includes at least one of signal power, interference, an indication of a number of communication terminals per area unit, or an indication of a handover probability of handover by the mobile communication device from one network node to another network node.

7. The apparatus according to claim 6, wherein the handover probability includes at least one of:

an intra-network handover probability of handover within one communication network from among the plurality of communication networks, or an inter-network handover probability of handover between different communication networks from among the plurality of communication networks.

8. The apparatus according to claim 1, wherein the current network-specific coverage data is single-network coverage data determined by the network operators of the plurality of communication networks.

9. A guiding node, comprising:

an aviation control node including:

an input interface configured for acquiring plural-network coverage data automatically reported to the aviation control node for connecting a mobile communication device to a communication network from among a plurality of communication networks serving an area, wherein the plurality of communication networks includes communication networks of the same standard operated by a plurality of network operators, the plural-network coverage data indicating current network connectivity at a location in the area and being determined based on an aggregation of current network-specific coverage data from the plurality of communication networks, wherein the aggregation current network-specific coverage data comprises a logical combination comparing the current network-specific coverage data from the plurality of communication networks, a vector aggregating the current network-specific coverage data from the plurality of communication networks, or any combination thereof;

circuitry configured for performing guiding of the mobile communication device based on the acquired plural-network coverage data, wherein the plural-network coverage data indicates network connectivity along three dimensions in the area, and wherein the area is a three-dimensional (3D) flight area and the mobile communication device is an unmanned aerial vehicle (UAV) guided in the 3D flight area, the UAV being separate from and different from each base station of a plurality of base stations included in the plurality of communication networks, wherein the plurality of communication networks including the plurality of base stations includes a first communication network including a plurality of first base stations and a second communication network different from the first communication network and including a plurality of second base stations, wherein each second base station of the plurality of second base stations is different from each first base station of the plurality of first base stations, wherein the first communication network is associated with a first carrier and the second communication network is associated with a second carrier different than the first carrier, wherein a transition from the first communication network associated with the first carrier to the second communication network associated with the second carrier is operable by roaming within a same region covered by the first communication network associated with the first carrier and the second communication network associated with the second carrier in the 3D flight area, and wherein the first carrier is associated with a first operator and the second carrier is associated with a second operator different than the first operator.

10. A method for computing plural-network coverage data for connecting a mobile communication device to a communication network from among a plurality of communication networks serving an area, wherein the plurality of communication networks includes communication networks of the same standard operated by a plurality of network operators, comprising:

acquiring current network-specific coverage data from the plurality of communication networks;

combining the current network-specific coverage data from the plurality of communication networks to provide a combination, wherein the combination comprises a logical combination comparing the current network-specific coverage data from the plurality of communication networks, a vector aggregating the current network-specific coverage data from the plurality of communication networks, or any combination thereof;

determining, based on the combination, plural-network coverage data indicating current network connectivity at a location in the area; and automatically reporting the plural-network coverage data to an aviation control node, wherein the plural-network coverage data indicates network connectivity along three dimensions in the area, wherein the area is a three-dimensional (3D) flight area and the mobile communication device is an unmanned aerial vehicle (UAV) guided in the 3D flight area, the UAV being separate from and different from each base station of a plurality of base stations included in the plurality of communication networks, wherein the plurality of communication networks including the plurality of base stations includes a first communication network including a plurality of first base stations and a second communication network different from the first communication network and including a plurality of second base stations, wherein each second base station of the plurality of second base stations is different from each first base station of the plurality of first base stations, wherein the first communication network is associated with a first carrier and the second communication network is associated with a second carrier different than the first carrier, and wherein a transition from the first communication network associated with the first carrier to the second communication network associated with the second carrier is operable by roaming within a same region covered by the first communication network associated with the first carrier and the second communication network associated with the second carrier in the 3D flight area, and wherein the first carrier is associated with a first operator and the second carrier is associated with a second operator different than the first operator.

11. A guiding method, comprising:

acquiring, with an aviation control node, plural-network coverage data automatically reported to the aviation control node for connecting a mobile communication device to a communication network from among a plurality of communication networks serving an area, wherein the plurality of communication networks includes communication networks of the same standard operated by a plurality of network operators, the plural-network coverage data indicating current network connectivity at a location in the area and being determined based on an aggregation of current network-specific coverage data from the plurality of communication networks, wherein the aggregation of current network-specific coverage data comprises a logical combination comparing the current network-specific coverage data from the plurality of communication networks, a vector aggregating the current network-specific coverage data from the plurality of communication networks, or any combination thereof; and performing, with the aviation control node, guiding of the mobile communication device based on the acquired plural-network coverage data, wherein the plural-network coverage data indicates network connectivity along three dimensions in the area, and wherein the area is a three-dimensional (3D) flight area and the mobile communication device is an unmanned aerial vehicle (UAV) guided in the 3D flight area, the UAV being separate from and different from each base station of a plurality of base stations included in the plurality of communication networks, wherein the plurality of communication networks including the plurality of base stations includes a first communication network including a plurality of first base stations and a second communication network different from the first communication network and including a plurality of second base stations, wherein each second base station of the plurality of second base stations is different from each first base station of the plurality of first base stations, wherein the first communication network is associated with a first carrier and the second communication network is associated with a second carrier different than the first carrier, and wherein a transition from the first communication network associated with the first carrier to the second communication network associated with the second carrier is operable by roaming within a same region covered by the first communication network associated with the first carrier and the second communication network associated with the second carrier in the 3D flight area, and wherein the first carrier is associated with a first operator and the second carrier is associated with a second operator different than the first operator.

12. The apparatus according to claim 1, wherein the first carrier is associated with at least one first frequency and the second carrier is associated with at least one second frequency different than the first frequency.

\* \* \* \* \*